US010985542B2

(12) United States Patent
Ide et al.

(10) Patent No.: US 10,985,542 B2
(45) Date of Patent: Apr. 20, 2021

(54) WIRE PROTECTING PROTECTOR AND PROTECTOR-EQUIPPED WIRE

(71) Applicant: Sumitomo Wiring Systems, Ltd., Mie (JP)

(72) Inventors: Takashi Ide, Mie (JP); Junya Yonekawa, Mie (JP); Tsutomu Sakata, Mie (JP); Daiki Nagayasu, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 38 days.

(21) Appl. No.: 16/495,577

(22) PCT Filed: Mar. 22, 2018

(86) PCT No.: PCT/JP2018/011278
§ 371 (c)(1),
(2) Date: Sep. 24, 2019

(87) PCT Pub. No.: WO2018/174124
PCT Pub. Date: Sep. 27, 2018

(65) Prior Publication Data
US 2020/0112152 A1 Apr. 9, 2020

(30) Foreign Application Priority Data
Mar. 22, 2017 (JP) .............................. JP2017-055404

(51) Int. Cl.
*H02G 3/04* (2006.01)
(52) U.S. Cl.
CPC ................................ *H02G 3/0487* (2013.01)

(58) Field of Classification Search
CPC .. H02G 3/0487; H02G 3/0418; H02G 3/0437; B60R 16/0215
(Continued)

(56) References Cited

U.S. PATENT DOCUMENTS

2006/0090916 A1* 5/2006 Suzuki ................ H02G 3/0691
174/481
2009/0084578 A1* 4/2009 Irisawa ............... B60R 16/0215
174/135

(Continued)

FOREIGN PATENT DOCUMENTS

JP 2000-261939 A 9/2000
JP 2004-006126 A 1/2004
(Continued)

OTHER PUBLICATIONS

International Search Report dated Jun. 12, 2018 for WO 2018/174124 A1.

*Primary Examiner* — Sherman Ng
(74) *Attorney, Agent, or Firm* — Abelman, Frayne & Schwab

(57) ABSTRACT

An object of the present invention is to reduce the constraints on the mounting of a wire protecting protector to a wire, while achieving a reduction in the weight of the wire protecting protector. A wire protecting protector is made of a foamed resin and is formed in a shape having a wire housing recess capable of housing a wire, and a surface of the wire protecting protector that includes an inner circumferential surface on the wire housing recess side is a surface formed through molding. Preferably, a reinforcing film is formed on at least a part of the surface of the wire protecting protector.

8 Claims, 10 Drawing Sheets

(58) Field of Classification Search
USPC ........................................................ 174/68.3
See application file for complete search history.

(56) References Cited

U.S. PATENT DOCUMENTS

| | | | |
|---|---|---|---|
| 2012/0055605 A1* | 3/2012 | Murata | H01B 13/01254 |
| | | | 156/51 |
| 2012/0091290 A1 | 4/2012 | Shitamichi | |
| 2015/0321625 A1* | 11/2015 | Sato | H02G 3/30 |
| | | | 174/72 A |
| 2015/0360629 A1 | 12/2015 | Sekino et al. | |
| 2016/0176368 A1* | 6/2016 | Osada | B60R 13/0846 |
| | | | 174/72 A |
| 2016/0366796 A1* | 12/2016 | Wakabayashi | H02G 3/0437 |

FOREIGN PATENT DOCUMENTS

| | | |
|---|---|---|
| JP | 2013-212005 A | 10/2013 |
| JP | 2013-236438 A | 11/2013 |
| JP | 2015-122923 A | 7/2015 |

\* cited by examiner

WIRE PROTECTING PROTECTOR AND PROTECTOR-EQUIPPED WIRE

CROSS REFERENCE TO RELATED APPLICATIONS

This application is a national phase of PCT application No. PCT/JP2018/011278, filed on 22 Mar. 2018, which claims priority from Japanese patent application No. 2017-055404, filed on 22 Mar. 2017, all of which are incorporated herein by reference.

TECHNICAL FIELD

The present invention relates to a technique for protecting wires.

BACKGROUND

Patent Document 1 discloses a technique for protecting wires using a protector that is a resin molded component obtained through molding or the like.

Patent Document 2 discloses a wire harness that has been molded into a routing configuration through resin molding, with a group of wires inserted into a groove of a mold. Patent Document 2 also discloses filling a part of the groove with a urethane foam.

PRIOR ART DOCUMENT

Patent Document

Patent Document 1: JP 2013-212005A
Patent Document 2: JP 2004-006126A

SUMMARY OF THE INVENTION

Problems to be Solved

However, the technique disclosed in Patent Document 1 is problematic in that the protector, which is a resin molded component, is heavy.

Also, the technique disclosed in Patent Document 2 poses the problem of considerable constraints on the production process because the wire harness is molded through resin molding into a routing configuration, with the wire group inserted into the groove of the mold.

Therefore, an object of the present invention is to reduce the constraints on the mounting of a wire protecting protector to a wire, while achieving a reduction in the weight of the wire protecting protector.

Means to Solve the Problem

To solve the above-described problems, a wire protecting protector according to a first aspect is directed to a wire protecting protector that is made of a foamed resin and is formed in a shape having a wire housing recess capable of housing a wire, wherein a surface of the wire protecting protector that includes an inner circumferential surface on the wire housing recess side is a surface formed through molding.

A second aspect is the wire protecting protector according to the first aspect including: a main body portion that includes a bottom portion and a pair of side wall portions provided on opposite sides of the bottom portion, the wire housing recess being formed between the bottom portion and the pair of side wall portions; and a cover portion configured to close an opening of the main body portion that is located on a side opposite to the bottom portion.

A third aspect is the wire protecting protector according to the second aspect, wherein a fitting recess is formed on one of the main body portion and the cover portion, and a fitting protrusion that can be press-fitted to the fitting recess is formed on the other.

A fourth aspect is the wire protecting protector according to any one of the first to third aspects, wherein a reinforcing film is formed on at least a part of the surface of the wire protecting protector.

A fifth aspect is the wire protecting protector according to the fourth aspect, including a thinned portion having a smaller thickness than other portions, wherein the reinforcing film is formed on the thinned portion.

A sixth aspect is the wire protecting protector according to the fourth or fifth aspect, including a force receiving portion configured to receive a force from the outside, wherein the reinforcing film is formed on a surface of the force receiving portion.

A seventh aspect is the wire protecting protector according to the sixth aspect, wherein the force receiving portion includes a vehicle fixing component attachment portion to which a vehicle fixing component that can be fixed to a vehicle is to be attached.

An eighth aspect is the wire protecting protector according to the sixth or seventh aspect, wherein the force receiving portion includes a wire fixation portion to which the wire is to be fixed.

A ninth aspect is the wire protecting protector according to any one of the first to eighth aspects, wherein the wire housing recess is formed in a shape to house the wire along a three-dimensional path.

A protector-equipped wire according to a tenth aspect includes: the wire protecting protector according to any one of the first to ninth aspects; and at least one wire housed in the wire housing recess.

Effect of the Invention

According to the first aspect, the wire protecting protector is made of a foamed resin, and it is therefore possible to reduce the weight thereof. Furthermore, the surface of the wire protecting protector that includes the inner circumferential surface on the wire housing recess side is a surface formed through molding, and it is therefore possible to house a wire in the wire housing recess and protect the wire, after producing the wire protecting protector. Accordingly, it is possible to reduce the constraints on the mounting of the wire protecting protector to the wire.

According to the second aspect, it is possible to protect the entire periphery of a wire by closing the opening of the main body portion with the cover portion after housing the wire inside the wire housing recess of the main body portion.

According to the third aspect, it is possible to attach the cover portion to the main body portion by fitting the fitting protrusion to the fitting recess.

According to the fourth aspect, the reinforcing film is formed on at least a part of the surface of the wire protecting protector, and it is therefore possible to reinforce the wire protecting protector made of a foamed resin.

According to the fifth aspect, it is possible to reinforce the thinned portion with the reinforcing film.

According to the sixth aspect, it is possible to reinforce the force receiving portion with the reinforcing film, thus making it possible to more easily withstand an external force.

According to the seventh aspect, it is possible to firmly attach the vehicle fixing component to the vehicle fixing component attachment portion of the wire protecting protector.

According to the eighth aspect, it is possible to firmly fix a wire to the wire fixation portion of the wire protecting protector.

According to the ninth aspect, it is possible to hold a wire so as to extend along a three-dimensional path.

According to the tenth aspect, the wire protecting protector is made of a foamed resin, and it is therefore possible to reduce the overall weight of the protector-equipped wire. Furthermore, it is possible to house a wire in the wire housing recess and protect the wire, after producing the wire protecting protector, and it is therefore also possible to reduce the constraints on the mounting of the wire protecting protector to the wire, thus making it possible to easily produce the protector-equipped wire.

DETAILED DESCRIPTION TO EXECUTE THE INVENTION

Figure 1:
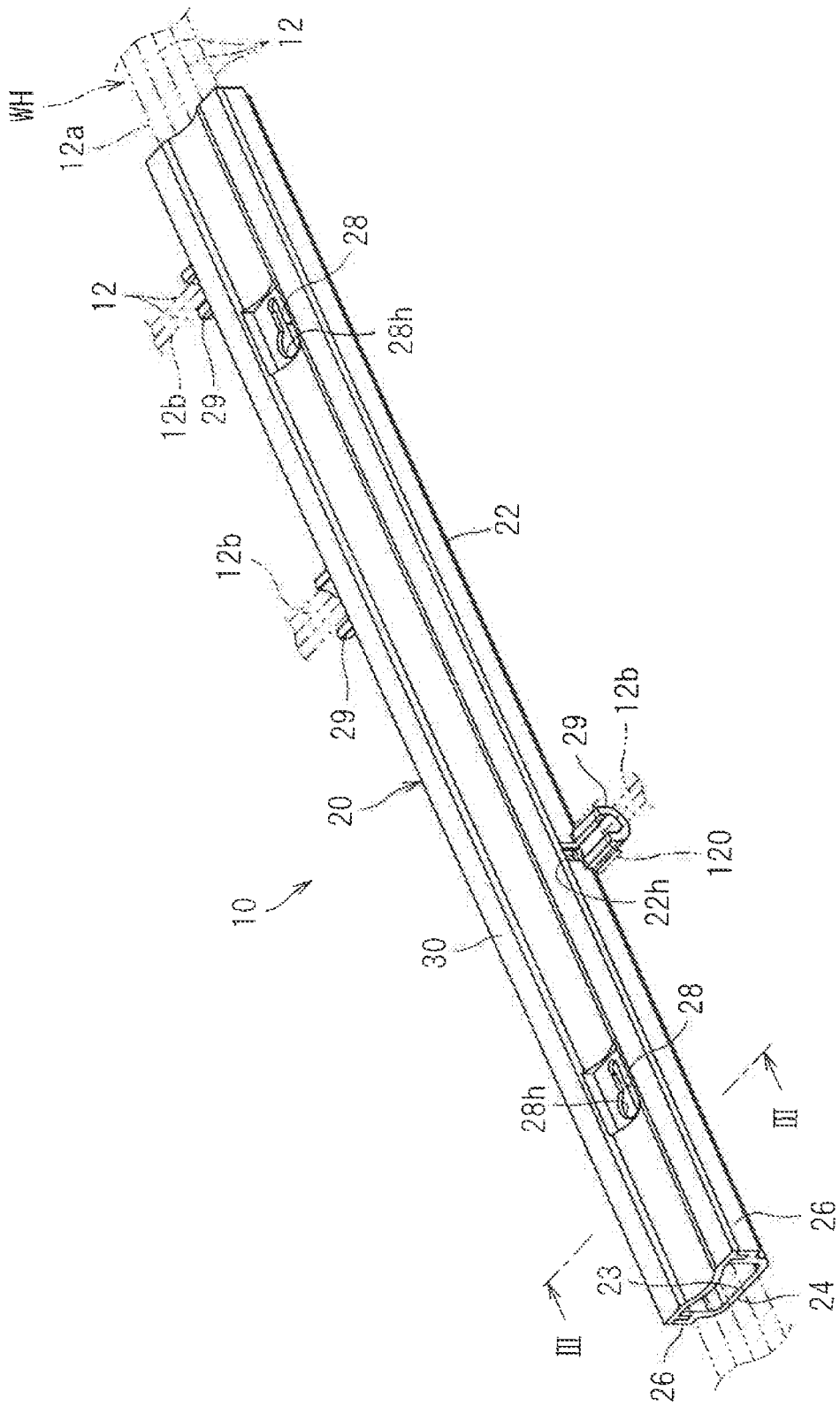
FIG. 1 is a schematic perspective view showing a protector-equipped wire.
Figure 2:
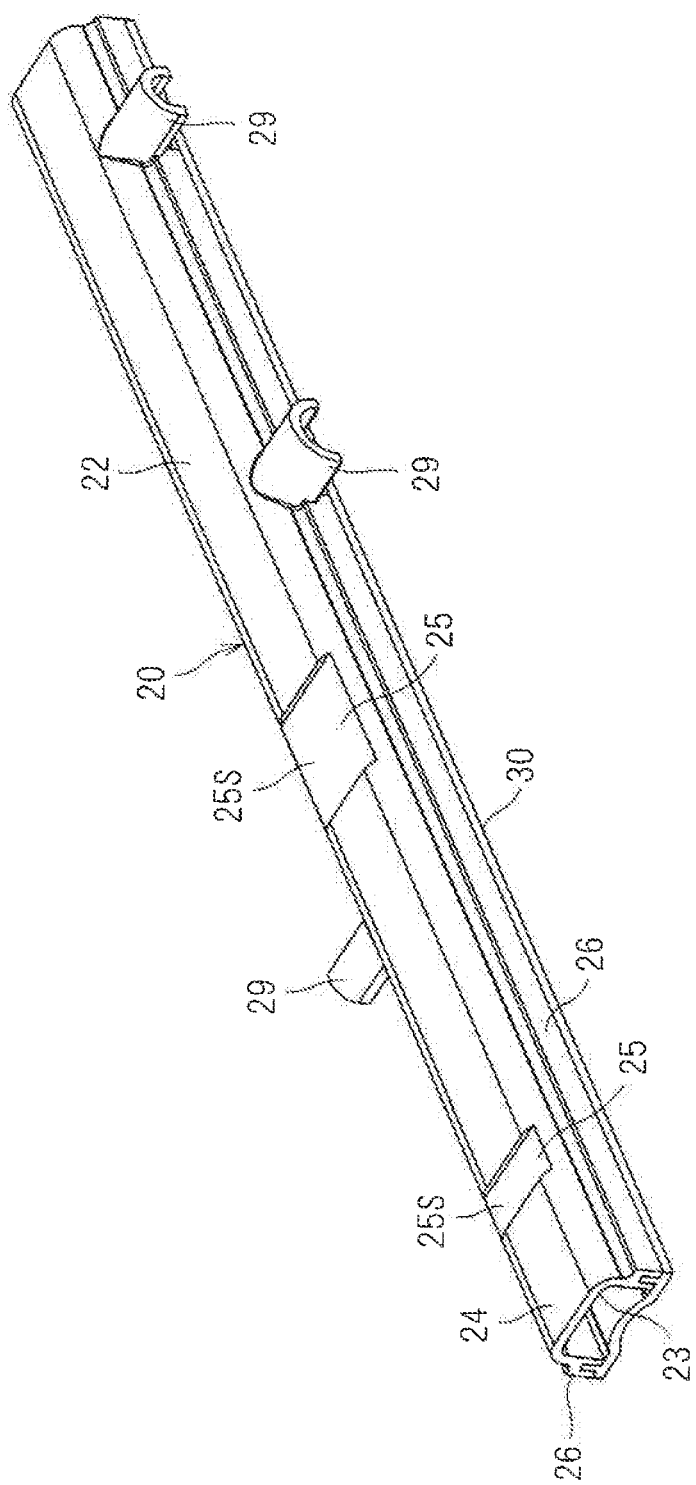
FIG. 2 is a perspective view showing a wire protecting protector.
Figure 3:
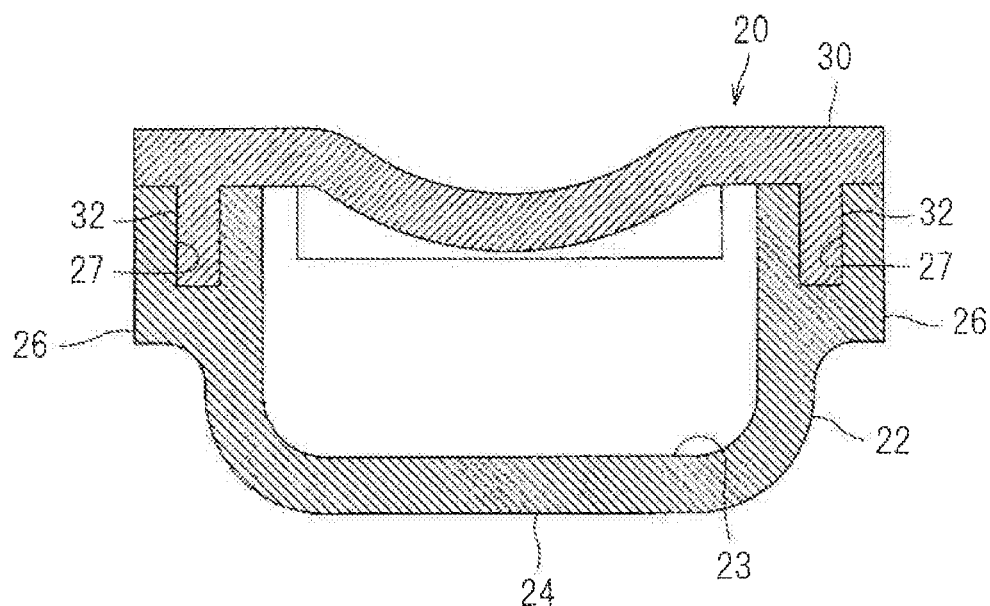
FIG. 3 is a cross-sectional view taken along the line II-II in FIG. 1.
Figure 4:
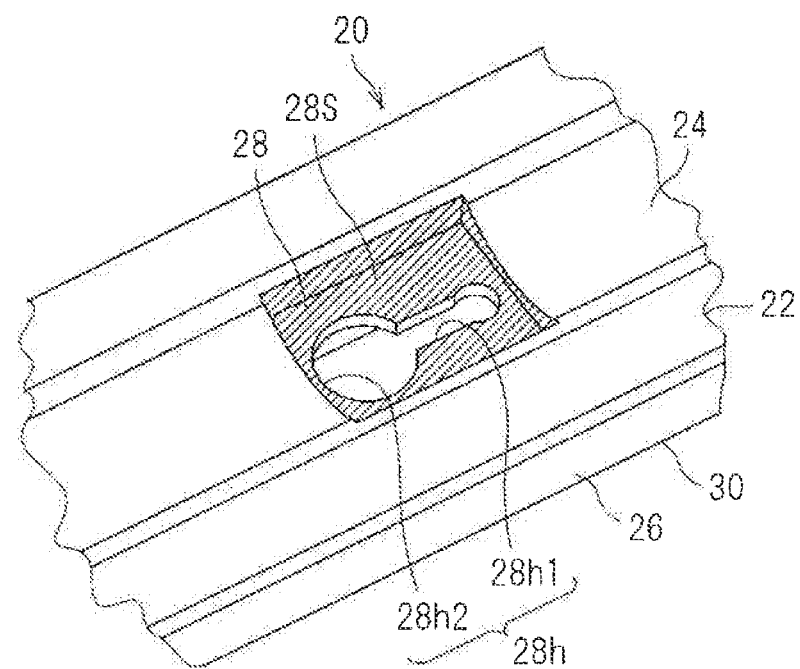
FIG. 4 is a partial enlarged view of FIG. 1.
Figure 5:
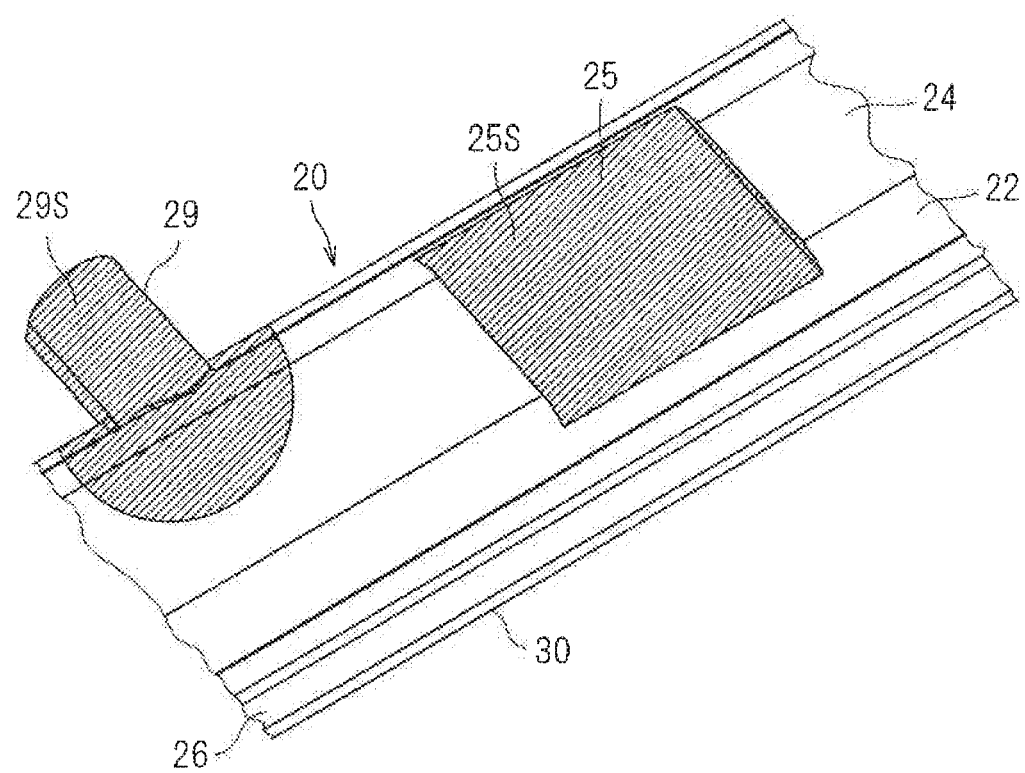
FIG. 5 is a partial enlarged view of FIG. 2.

Hereinafter, a wire protecting protector and a protector-equipped wire according to an embodiment will be described. FIG. 1 is a schematic perspective view showing a protector-equipped wire 10, FIG. 2 is a perspective view showing a wire protecting protector 20, FIG. 3 is a cross-sectional view taken along the line II-II in FIG. 1, FIG. 4 is a partial enlarged view of FIG. 1, and FIG. 5 is a partial enlarged view of FIG. 2.

The protector-equipped wire 10 includes a wire 12 and a wire protecting protector 20.

The wire 12 includes a coating portion formed, for example, by extrusion coating a resin on the outer circumference of a core wire. Here, a plurality of wires 12 are bundled to form a wire bundle 12a. Some of the wires are branched in an intermediate part of the wire bundle 12a in the extension direction thereof, thus forming branched portions 12b. Here, the wire protecting protector 20 houses and protects the intermediate part of the wire bundle 12a in the extension direction. In addition, the branched portions 12b are branched at a part of the wire bundle 12a that is housed by the wire protecting protector 20. Note that at least one wire may be included in the protector-equipped wire 10. The wires 12 described above are used as wiring for electrically connecting various electric devices mounted in a vehicle or the like to each other, with the wires 12 being disposed at a placement target location.

The wire protecting protector 20 is made of a foamed resin and is formed in a shape having a wire housing recess 23 capable of housing the wires 12. The foamed resin is a resin containing bubbles. As the resin, it is possible to use, for example, polyolefin (polyethylene (PE), polypropylene, etc.), polystyrene, polyurethane, and modified polyphenylene ether (m-PPE). A surface of the wire protecting protector 20 that includes the inner circumferential surface on the wire housing recess 23 side is a surface formed through molding. In other words, the wire protecting protector 20 is a molded article that has been formed in a predetermined shape capable of housing the wires 12, before being mounted to the wires 12. The wire protecting protector 20 described above can protect the wires 12, and serve to regulate the path of the wires 12.

Here, the wire protecting protector 20 includes a main body portion 22 and a cover portion 30.

The main body portion 22 includes a bottom portion 24 and a pair of side wall portions 26. The bottom portion 24 is formed in an elongated plate shape corresponding to the placement path of the wires 12. Here, the bottom portion 24 is formed in a rectangular plate shape. The bottom portion 24 may be bent in the width direction thereof, or may be bent in the thickness direction thereof, depending on the placement path of the wires. The pair of side wall portions 26 are formed standing from opposite edges of the bottom portion 24 in the width direction, toward one principal surface of the bottom portion 24. Then, the bottom portion 24 and the pair of side wall portions 26 form the wire housing recess 23. The wire housing recess 23 is open on a side opposite to the bottom portion 24, and is also open on opposite ends of the bottom portion 24 in the extension direction.

The cover portion 30 is formed so as to close an opening of the main body portion 22 that is located on a side opposite to the bottom portion 24. More specifically, the dimension of the cover portion 30 in the width direction is set to be comparable to the interval between the outer peripheral surfaces of the pair of side wall portions 26, and the cover portion 30 is placed on the pair of side wall portions 26 so as to span the space between the pair of side wall portions 26, thus closing the aforementioned opening. Although the cover portion 30 here is formed so as to close the entire opening of the main body portion 22 that is located on the side opposite to the bottom portion 24, the cover portion 30 may close a part of the opening. The central part of the cover portion 30 in the width direction is bent in an arc shape so as to protrude to the wire housing recess 23 side of the main body portion 22, and the central part of the cover portion 30 in the width direction is recessed as viewed from the outside. This shape is in conformity with the shape of an attachment target portion B of the wire protecting protector 20 that protrudes on the wire protecting protector 20 side (see FIGS. 9 and 10).

To maintain the state in which the cover portion 30 is attached to the main body portion 22, a fitting recess 27 is formed in one of the main body portion 22 and the cover portion 30, and a fitting protrusion 32 is formed in the other.

Here, a fitting recess 27 is formed in an edge of each of the pair of side wall portions 26 of the main body portion 22, the edge being located on a side opposite to the bottom portion 24. More specifically, the edges of the pair of side wall portions 26 that are located on a side opposite to the bottom portion 24 are formed to have a larger thickness than other portions. Here, the edges of the pair of side wall portions 26 are formed to have a larger thickness so as to protrude outward. Then, in a part of each of the edges of the pair of side wall portions 26 with which the cover portion 30 comes into contact, a groove-shaped fitting recess 27 extending along the extension direction of the side wall portions 26 is formed. Each fitting recess 27 may be a recess that has been partially formed in the extension direction of the pair of side wall portions 26.

A pair of fitting protrusions 32 are formed at opposite ends of a surface of the cover portion 30 that comes into contact with the pair of side wall portions 26. Each of the pair of fitting protrusions 32 is formed in the shape of a protrusion extending along the extension direction of a side part of the cover portion 30. The width of the fitting protrusions 32 is set to be larger (slightly larger) than the width of the fitting recesses 27.

The main body portion 22 and the cover portion 30 are made of a foamed resin, and thus can compressively deform to a certain degree. Therefore, when each fitting protrusion 32 is fitted into the corresponding fitting recess 27, the fitting protrusion 32 compressively deforms in the width direction, and a side part of each of the side wall portions 26 elastically deforms so as to widen the opening width of the fitting recess 27. This allows the fitting protrusion 32 to be press-fitted into the fitting recess 27. In a state in which the fitting protrusion 32 is press-fitted into the fitting recess 27, the fitting protrusion 32 tries to elastically return to the original width thereof, and a side part of the side wall portion 26 tries to elastically deform so as to return the width of the fitting recess 27 to the original width thereof. Accordingly, the fitting protrusion 32 is less likely to come off from the fitting recess 27, thus making it possible to maintain the state in which the cover portion 30 is attached to the main body portion 22.

The fitting recess may be formed on the main body portion side, and the fitting protrusion 32 may be formed on the cover portion side. Alternatively, the fitting protrusion 32 and the fitting recess 27 may be omitted. In this case, with the cover portion being placed on top of the main body portion, a binding member such as adhesive tape or a cable tie may be wrapped around the outer periphery of the main body portion. A groove may be formed in a part of the wire protecting protector 20 around which the binding member is to be wrapped.

The presence of the cover portion 30 is not essential. In this case, with the wires being housed inside the main body portion, a binding member such as adhesive tape or a cable tie may be wrapped around the outer periphery of the main body portion. Alternatively, a tongue piece-shaped installation piece may be formed extending from an end of the main body portion, and, with the wires being disposed along the installation piece, a binding member such as adhesive tape or a cable tie may be wrapped around the installation piece and the wires.

Reinforcing films 25S, 28S, and 29S are formed on at least a part of the surface of the wire protecting protector 20 (in FIGS. 4 and 5, the regions in which the reinforcing films 25S, 28S, and 29S are formed are indicated by slanting lines). Each of the reinforcing films 25S, 28S, and 29S is a film that has been formed to have a higher strength than the main body portion 22 and so forth, and may be, for example, an unfoamed urethane coating film or the like. The reinforcing film 25S can be formed, for example, by spraying a mist of a coating liquid, or applying a coating liquid, onto a target portion, or immersing (the so-called dipping) the target portion in a coating liquid. The reinforcing films 25S, 28S, and 29S may be formed on the entire surface of the wire protecting protector 20, or may be formed on a part of the surface of the wire protecting protector 20. In terms of the weight reduction and the material costs for forming the reinforcing films, it is preferable that the reinforcing films 25S, 28S, and 29S are formed on a part of the surface of the wire protecting protector 20.

In particular, it is preferable that the reinforcing films are formed in the following locations.

First, when a thinned portion 25 having a smaller thickness than other portions is formed in the wire protecting protector 20, it is preferable that the reinforcing film 25S is formed in the thinned portion 25. Here, the thinned portion 25 is formed on the bottom portion 24 of the main body portion 22. More specifically, the thinned portion 25 is formed at a partial location in the extension direction of the bottom portion 24. The thinned portion 25 is formed across the entire width direction of the bottom portion 24. The thinned portion 25 is formed to have a smaller thickness than a part of the bottom portion 24 that is adjacent to the location where the thinned portion 25 is formed. Such a thinned portion 25 is formed, for example, in order to avoid a contact with another portion 100 (e.g., a vehicle body portion), if present, that passes along a portion near the wire protecting protector 20 when mounting the protector-equipped wire 10 to a vehicle (see FIGS. 9 and 10). That is, a portion of the outward-facing part of the bottom portion 24 that is to be prevented from coming into contact with the other portion 100 is formed to be recessed. Note that the inward-facing part of the bottom portion 24 is formed as a flat surface, regardless of the presence or absence of the thinned portion 25.

The reinforcing film 25S is formed on the thinned portion 25. The reinforcing film 25S may be formed on either surface of the thinned portion 25, or may be formed on only one surface thereof. Here, the reinforcing film 25S is formed on only the outward-facing surface of the thinned portion 25.

When a force receiving portion that receives a force from the outside is formed in the wire protecting protector 20, it is preferable that a reinforcing film is formed on the surface of the force receiving portion.

Figure 9:
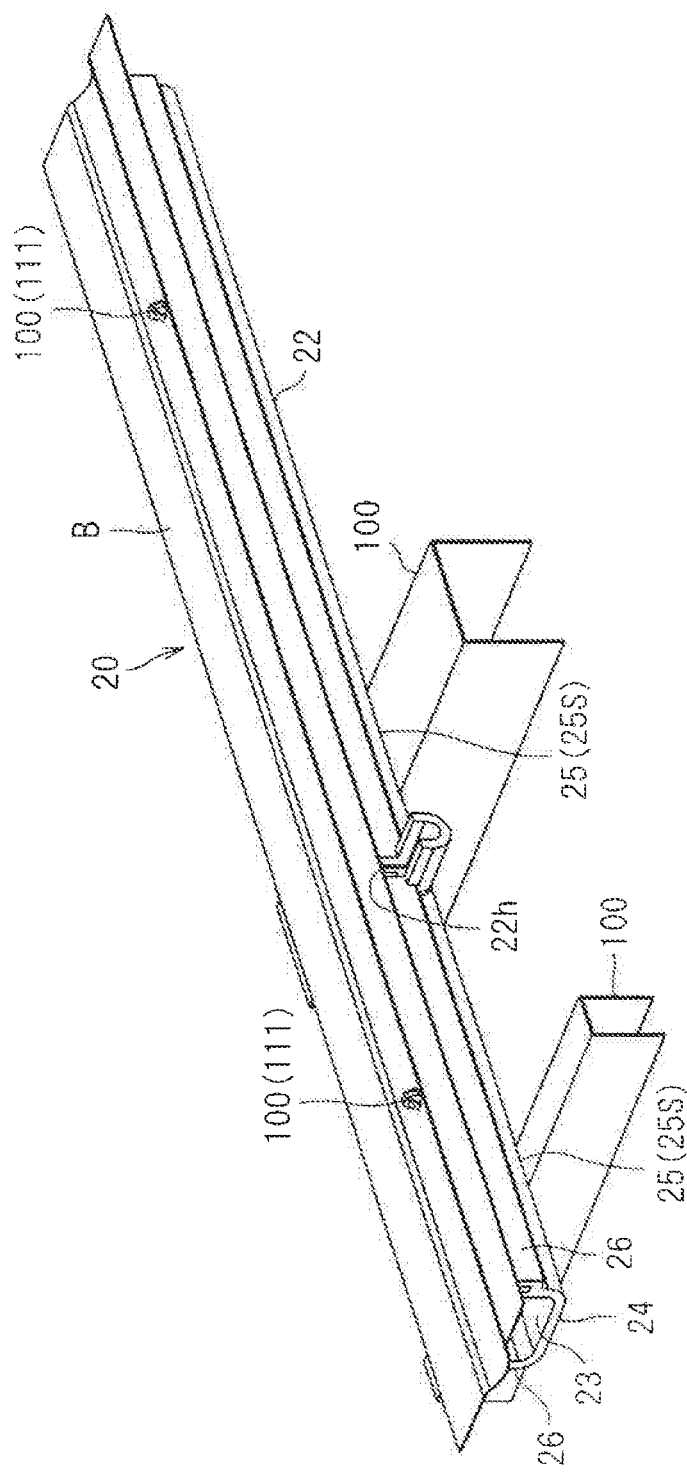
FIG. 9 is a schematic perspective view showing an example of fixing the protector-equipped wire to a vehicle.
Figure 10:
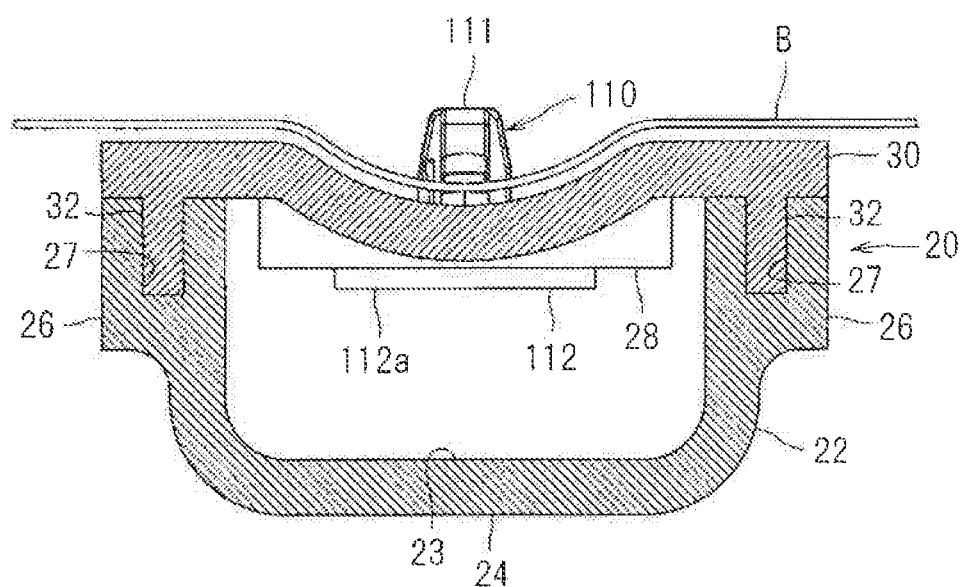
FIG. 10 is a schematic cross-sectional view showing an example of fixing the protector-equipped wire to a vehicle.

Here, a vehicle fixing component attachment portion 28 to which a clamp component 110 is to be attached as a vehicle fixing component that can be attached to the attachment target portion B of a vehicle is formed in the wire protecting protector 20 (see FIGS. 9 and 10). Since the vehicle fixing component attachment portion 28 is fixed to the attachment target portion B of the vehicle via the clamp component 110, the vehicle fixing component attachment portion 28 is an example of the force receiving portion that receives a force from the outside in order to support the protector-equipped wire 10.

Specifically, the vehicle fixing component attachment portion 28 is formed on the cover portion 30 of the main body portion 22. The vehicle fixing component attachment portion 28 is provided at a partial position in the extension direction of the cover portion 30. The vehicle fixing component attachment portion 28 is configured by forming an attachment hole 28h in a square plate-shaped portion formed on the cover portion 30. The attachment hole 28h is configured by forming, on one end side of an elongated slit-shaped portion 28h1, an insertion hole 28h2 that is larger than the slit-shaped portion 28h1.

The clamp component 110 includes a clamp portion 111 that is passed through and fixed to the attachment target portion B, and a head portion 112. The head portion 112 is configured by providing a disk-like plate-shaped portion 112a continuously with a proximal end of the clamp portion 111 via a neck portion.

Then, when the neck portion is slidably moved toward the inside of the slit-shaped portion 28hl, with the plate-shaped portion 112a being passed through the insertion hole 28h2 from the outside of the cover portion 30, opposite sides of the slit-shaped portion 28hl of the vehicle fixing component attachment portion 28 are sandwiched between the plate-shaped portion 112a and the clamp portion 111. Consequently, the clamp component 110 is attached to the vehicle fixing component attachment portion 28 described above. The reinforcing film 28S is formed on the surface of the vehicle fixing component attachment portion 28. The reinforcing film 28S may be formed on either surface of the vehicle fixing component attachment portion 28, or may be formed on only one surface thereof. Here, the reinforcing film 28S is formed on only the outward-facing surface of the vehicle fixing component attachment portion 28.

Note that the vehicle fixing component attachment portion 28 described above may be formed on the main body portion 22 side.

The clamp component may be fixed, through wrapping with tape for example, to the wire 12 extending from the wire protecting protector 20.

The wire protecting protector 20 includes a wire fixation portion 29 to which the wire 12 is to be fixed. Here, an opening 22h for guiding a branched portion 12b outward is formed in an intermediate part of the main body portion 22 in the extension direction, and a wire fixation portion 29 extending outward from the opening 22h is formed. The wire fixation portion 29 is formed in a semicylindrical shape extending outward from the bottom of the opening 22h. The wire fixation portion may be formed in a cross-sectionally L-shape, or may be formed in a flat plate shape. The branched portion 12b is pulled outward, while being housed inside the wire fixation portion 29. Then, as a result of a binding member 120 such as adhesive tape or a cable tie being wrapped around the branched portion 12b and the wire fixation portion 29, the branched portion 12b is fixed to the wire fixation portion 29 (shown in only one location in FIG. 2). When the branched portion 12b is pulled or pushed, such forces from the outside are received by the wire fixation portion 29 so as to prevent the wire 12 from being displaced inside the wire protecting protector 20. Accordingly, the wire fixation portion 29 is also an example of the force receiving portion that receives a force from the outside in order to support the protector-equipped wire 10.

The reinforcing film 29S is formed on a surface of the wire fixation portion 29. The reinforcing film 25S may be formed on either surface of the wire fixation portion 29, or may be formed on only one surface thereof. Here, the reinforcing film 25S is formed on only the outward-facing surface (on the outer peripheral side) of the wire fixation portion 29.

Here, the reinforcing film 29S is also formed on the surface of a part of the wire protecting protector 20 that supports a proximal end of the wire fixation portion 29, that is, a part of the bottom portion 24 that surrounds the proximal end of the wire fixation portion 29. Accordingly, it is possible to firmly hold the wire fixation portion 29, for example, when the wire fixation portion 29 is pulled. A clamp component may be fixed to the wire fixation portion 29 together with the wire 12, for example, through wrapping with tape.

An example of the production of the wire protecting protector 20 described above will be described.

Figure 6:
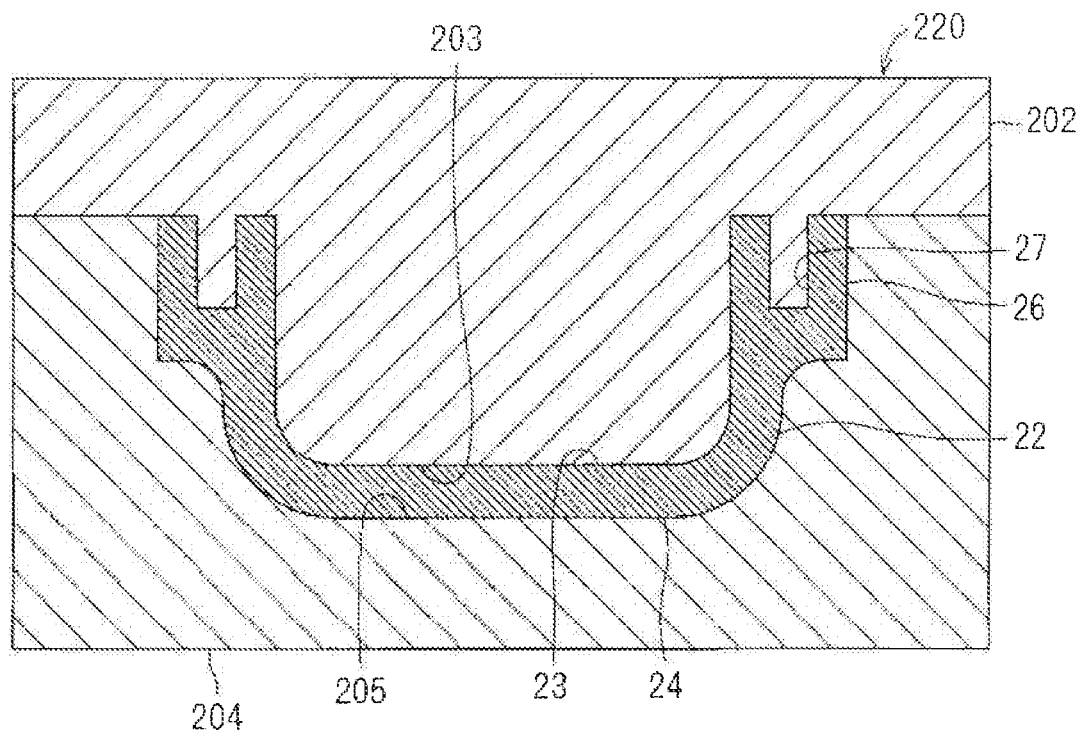
FIG. 6 is a diagram illustrating a manufacturing step of a main body portion.

First, as shown in FIG. 6, a mold 200 for forming the main body portion 22 is provided. The mold 200 includes an upper mold 202 and a lower mold 204, and mold surfaces 203 and 205 for forming the main body portion 22 are formed on the upper mold 202 and the lower mold 204, respectively. With the upper mold 202 and the lower mold 204 being closed, a closed mold space for forming the main body portion 22 is formed by the mold surfaces 203 and 205. The interior of this mold space is filled with foamed resin particles for forming the main body portion 22, and the foamed resin particles are fused together in the mold space. Alternatively, a foamed resin is poured into the mold space to fill the mold space. Then, after cooling, the main body portion 22 is taken out from the mold 200.

Figure 7:
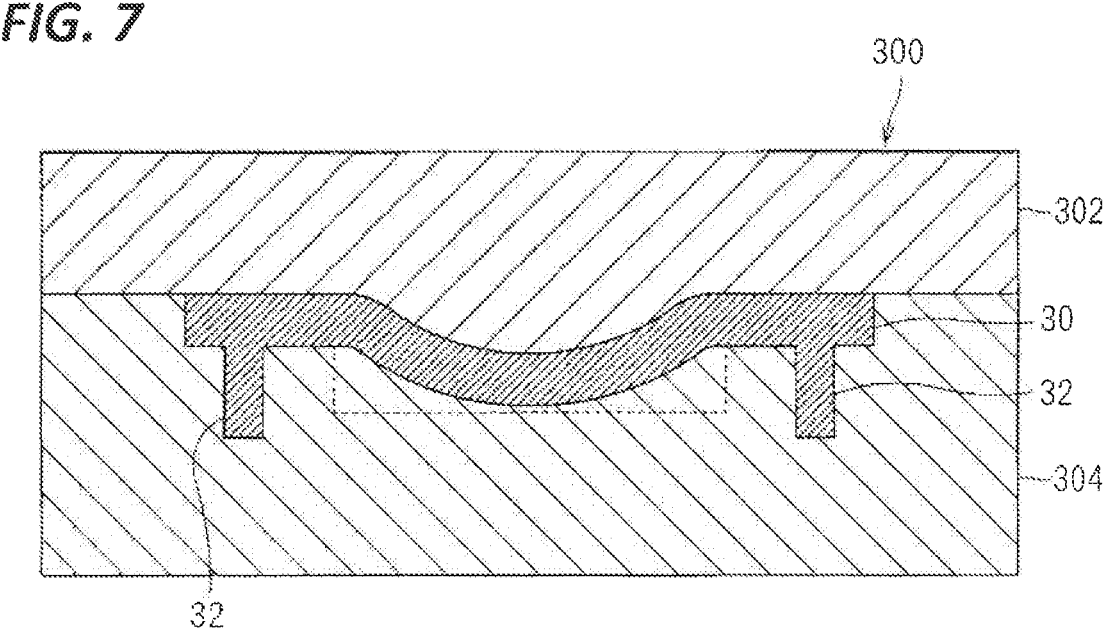
FIG. 7 is a diagram illustrating a manufacturing step of a cover portion.

Similarly, as shown in FIG. 7, the cover portion 30 is formed using a mold 300 that includes an upper mold 302 and a lower mold 304 for forming the cover portion 30.

Figure 8:
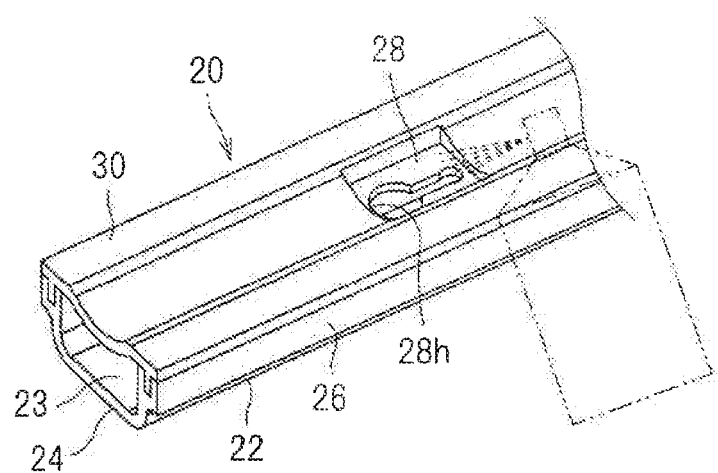
FIG. 8 is a diagram illustrating an example of a manufacturing step of a reinforcing film.

Then, as shown in FIG. 8, reinforcing films 25S, 28S, and 29S are formed on the wire protecting protector 20. FIG. 8 shows a step of forming a reinforcing film 28S on the vehicle fixing component attachment portion 28. Here, the reinforcing film 28S is formed by spraying, using a spray device, a liquid urethane to the vehicle fixing component attachment portion 28. A mask may be or may not be provided on a part surrounding the vehicle fixing component attachment portion 28.

FIGS. 9 and 10 each shows a state in which the wire protecting protector 20 is attached to the attachment target portion B. As shown in these drawings, the clamp component 110 is fixed to the vehicle fixing component attachment portion 28 via the head portion 112, and the clamp portion 111 protrudes outward from the cover portion 30. Then, as a result of the clamp component 110 being inserted into the attachment hole formed in the attachment target portion B, the clamp component 110 is attached to the attachment target portion B. and the wire protecting protector 20 is attached to the attachment target portion B via the clamp component 110.

In this state, another portion 100 is present outward of the thinned portion 25 of the main body portion 22. However, the thinned portion 25 of the wire protecting protector 20 is recessed relative to other portions, and, therefore, a contact between the wire protecting protector 20 and the other portion 100 is prevented.

With the wire protecting protector 20 and the protector-equipped wire 10 configured in the above-described manner, the wire protecting protector 20 is made of a foamed resin, and it is therefore possible to reduce the weight thereof. Furthermore, the surface of the wire protecting protector 20 that includes the inner circumferential surface on the wire housing recess 23 side is a surface formed through molding, and it is therefore possible to house a wire 12 in the wire housing recess 23 and protect the wire 12, after producing the wire protecting protector 20. The operation at this time can be performed, for example, on a commonly used wire harness assembly drafting board without using any mold, in the same manner as in Patent Document 2. Accordingly, it is possible to reduce the constraints on the mounting of the wire protecting protector 20 to the wire 12.

Furthermore, it is possible to protect the entire periphery of a wire 12 by closing the opening of the main body portion 22 with the cover portion 30 after housing the wire 12 inside the wire housing recess 23 of the main body portion 22.

Furthermore, the fitting protrusion 32 is formed on one of the main body portion 22 and the cover portion 30, and the fitting recess 27 is formed on the other, and it is therefore possible to attach the cover portion 30 to the main body portion 22 by press-fitting the fitting protrusion 32 to the fitting recess 27. Of course, adhesive tape or the like may be wrapped around the main body portion 22 and the cover portion 30 for the purpose of reinforcement also in a configuration in which the fitting protrusion 32 and the fitting recess 27 are provided.

Furthermore, the reinforcing films 25S, 28S, and 29S are formed on at least a part of the surface of the wire protecting protector 20, and it is therefore possible to reinforce the wire protecting protector 20 made of a foamed resin.

The reinforcing films 25S, 28S, and 29S may be formed on either surface of the wire protecting protector 20, but may be formed on only one surface thereof. In this case, it is preferable that the reinforcing films are formed on the surface on the outer side in order to suppress a damage caused by external contact.

Furthermore, the reinforcing film 25S is formed on the thinned portion 25, and it is therefore possible to reinforce the thinned portion 25.

Furthermore, the reinforcing films 28S and 29S are formed on the force receiving portion that receives a force from the outside, thus making it possible to more easily withstand an external force. Here, the reinforcing film 28S is formed on the vehicle fixing component attachment portion 28 to which the clamp component 110 is to be attached, and it is therefore possible to hold the clamp component 110 in a firmly attached state. The reinforcing film 29S is formed on the wire fixation portion 29, and it is therefore possible to firmly hold the wire 12.

Figure 11:
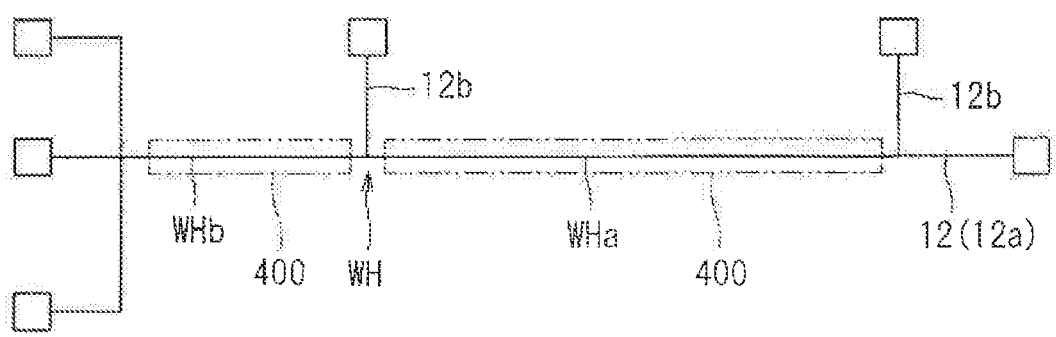
FIG. 11 is a diagram illustrating an example of mounting protection members in a wire harness.

Assuming that a plurality of portions to be protected WHa and WHb are present in a given wire harness WH as shown in FIG. 11, if a protector that is a resin molded component is to be used to protect these portions, the protector will be increased in size and weight. For this reason, such portions are protected, for example, separately using a plurality of protection members 400 (e.g., a plurality of protectors, or a combination of a protector and a protective sheet, etc.).

Figure 12:
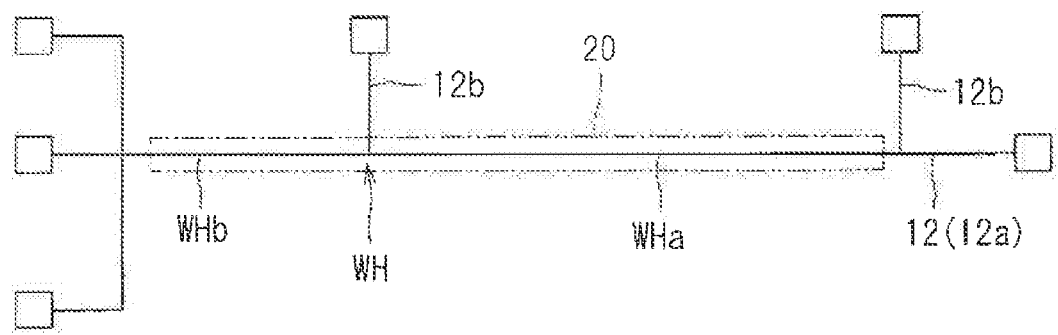
FIG. 12 is a diagram illustrating an example of mounting a wire protecting protector in a wire harness.

According to the present embodiment, it is possible to reduce the weight of the wire protecting protector 20 that protects the wire 12. Therefore, as shown in FIG. 12, a plurality of portions to be protected WHa and WHb can be protected by a single wire protecting protector 20 with a light-weight configuration. Accordingly, it is also possible to adopt a step of attaching a single wire protecting protector 20, in place of a step of attaching a plurality of protection members, thus making it also possible to simplify the production process.

Figure 13:
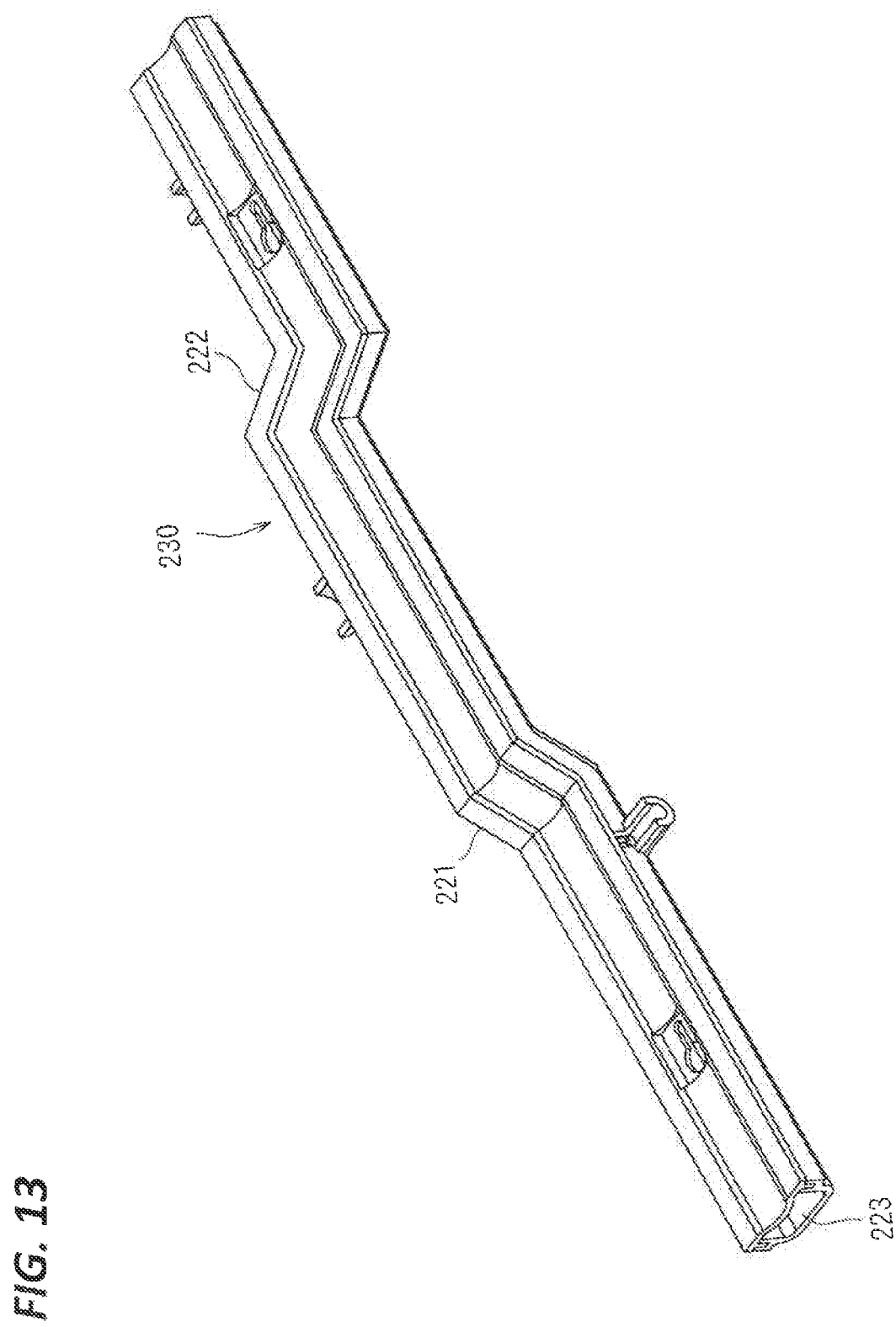
FIG. 13 is a schematic perspective view showing a wire protecting protector according to a modification.

FIG. 13 is a schematic perspective view showing a wire protecting protector 220 according to a modification. The wire protecting protector 220 is formed by bending the wire protecting protector 20 described in the above embodiment, upward in a crank shape via bent portion 221 at a part located midway from one end to the other end thereof, and further bending the wire protecting protector 20, from that part, to one side in the width direction in a crank shape via a bent portion 222 at a part located midway to the other end. Accordingly, the wire protecting protector 20 is bent upward, downward, rightward, and leftward at intermediate portions in the extension direction thereof. The wire protecting protector 220 includes a wire housing recess 223 extending along the extension direction thereof. Since the wire protecting protector 220 itself has a shape that extends while being three-dimensionally bent, the wire housing recess 223 inside the wire protecting protector 220 also forms a wire housing space that is three-dimensionally bent. Accordingly, a wire housed inside the wire housing recess 223 is housed along a three-dimensional path.

Thus, with the wire protecting protector 220, it is possible to regulate a wire along a three-dimensional path.

The configurations described in the embodiment and the modification may be combined as appropriate as long as there are no mutual inconsistencies.

Although the present invention has been described above in detail, the foregoing description is in all aspects illustrative and the invention is not limited thereto. It will be appreciated that numerous modifications not illustrated herein can be made without departing from the scope of the present invention.

LIST OF REFERENCE NUMERALS

10 Protector-equipped wire
12 Wire
12*b* Branched portion
20, 220 Wire protecting protector
22 Main body portion
23, 223 Wire housing recess
24 Bottom portion
25 Thinned portion
25S, 28S, 29S Reinforcing film
26 Side wall portion
27 Fitting recess
28 Vehicle fixing component attachment portion
29 Wire fixation portion
30 Cover portion
32 Fitting protrusion
110 Clamp component

The invention claimed is:

1. A wire protecting protector that is made of a foamed resin and that is formed in a shape having a wire housing recess capable of housing a wire,
    wherein a surface of the wire protector that includes an inner circumferential surface on the wire housing recess side is a surface formed through molding,
    wherein a reinforcing film is formed on at least a part of the surface of the wire protector,
    wherein the wire protector includes a thinned portion having a smaller thickness than other portions, and wherein the reinforcing film is formed on the thinned portion, and wherein the thinned portion is recessed relative to the other portions.

2. The wire protector according to claim 1, further comprising:
    a main body portion that includes a bottom portion and a pair of side wall portions provided on opposite sides of the bottom portion, the wire housing recess being formed between the bottom portion and the pair of side wall portions; and
    a cover portion configured to close an opening of the main body portion that is located on a side opposite to the bottom portion.

3. The wire protector according to claim 2,
    wherein a fitting recess is formed on one of the main body portion and the cover portion, and a fitting protrusion that can be press-fitted to the fitting recess is formed on the other.

4. The wire protector according to claim 1, further comprising
   a force receiving portion configured to receive a force from the outside,
   wherein the reinforcing film is formed on a surface of the force receiving portion.
5. The wire protector according to claim 4,
   wherein the force receiving portion includes a vehicle fixing component attachment portion to which a vehicle fixing component that can be fixed to a vehicle is to be attached.
6. The wire protector according to claim 4,
   wherein the force receiving portion includes a wire fixation portion to which the wire is to be fixed.
7. The wire protector according to claim 1,
   wherein the wire housing recess is formed in a shape to house the wire along a three-dimensional path.
8. A protector-equipped wire comprising:
   the wire protector according to claim 1; and
   at least one wire housed in the wire housing recess.

\* \* \* \* \*